United States Patent [19]

Shields

[11] Patent Number: 5,003,930
[45] Date of Patent: Apr. 2, 1991

[54] ANIMAL TRAINING COLLAR

[76] Inventor: Michael R. Shields, 1702 Three Meadows Rd., Greensboro, N.C. 27408

[21] Appl. No.: 513,067

[22] Filed: Apr. 23, 1990

[51] Int. Cl.⁵ .............................................. A01K 27/00
[52] U.S. Cl. ...................................... 119/106; 119/109
[58] Field of Search ........................... 119/106, 109, 29

[56] References Cited

U.S. PATENT DOCUMENTS

| | | | |
|---|---|---|---|
| 1,924,596 | 8/1933 | Davis | 119/106 |
| 2,791,202 | 5/1957 | Doyle | 119/106 |
| 2,798,458 | 7/1957 | Odermatt | 119/106 |
| 2,900,696 | 8/1959 | Bacon | 119/106 |
| 3,817,218 | 6/1974 | Bongiovanni | 119/106 |

FOREIGN PATENT DOCUMENTS 475103  11/1937  United Kingdom ................ 119/106

*Primary Examiner*—John G. Weiss

[57] ABSTRACT

An unitary plastic training collar for animals is presented which includes end members which are slotted for forming a noose which can be used to restrain an animal, for example during training exercises. By pulling a leash attached to the collar the collar will slip tighter around the neck of the animal and when the leash is slack, the collar springs open due to the inherent memory of the polymeric material from which it is formed.

18 Claims, 2 Drawing Sheets

ANIMAL TRAINING COLLAR

BACKGROUND OF THE INVENTION

1. Field Of The Invention

The present invention pertains to collars for training animals, and specifically to collars which are of the choke type as are use in training domestic dogs.

2. Description Of The Prior Art And Objectives Of The Invention

Dog trainers in recent years have increasingly used collars of the slip or "noose" type which are attached to a trainer's leash and which will close and increasingly tighten around the dog's neck as the leash is pulled, or conversely as the dog pulls thereagainst. Conventional choke collars are formed from leather, nylon ropes or straps, and metal chains. While such prior art collars are effective in tightening, once pressure is released therefrom they oftentimes become jammed in the closed configuration due to manufactured irregularities in the collar (chain links), or by the links or surface irregularities becoming embedded with hair, or in some cases with skin. Thus, the inability of the conventional slide mechanisms to quickly release allowing the collar to loosen can be both physically harmful to the animal and can be confusing thereto, causing the animal to misinterpret the commands received. Also, conventional choke collars can cause irritation, hair loss and bleeding to the neck of the animal, which harmful effects can long endure long after the collar is removed to the dismay of the animal and owner.

Thus with the problems and disadvantages associated with prior art choke collars, the present invention was conceived and one of its objectives is to provide a safe, quick releasing collar of the choke type which can be easily fitted around the animal's neck and which will have a smooth outer surface to help prevent entanglement with the animal's hair.

It is still another objective of the present invention to provide an animal training collar which is formed from a polymeric material which has an inherent memory to return the collar to an open configuration once the leash force has slackened.

It is still another objective of the present invention to provide a smooth unitary collar having slotted end members which can be economically manufactured and which is both durable and safe for the animal.

Various other advantages and objectives of the invention will be realized as a more detailed representation of the invention is presented below.

SUMMARY OF THE INVENTION

The aforesaid and other objectives are realized by providing a training, choke type collar which is formed from a lightweight synthetic such as an elastomeric thermoplastic material as sold under the Hytrel mark of Du Pont Company of Wilmington, Del. The collar is formed with a neck encircling band and each end is provided with a band receiver consisting of a slotted member whereby one end can be placed through the slot in the other and a leash can be attached to the first end for restraint and control purposes by an animal trainer. As the collar is formed from a material with substantial memory, the collar will attempt to return to its fully opened position at all times. Thus, if the dog pulls the leash, or vice versa, the collar will slide to a tightly closed configuration around the dog's neck as long as the leash is taut. When the leash returns to a slack posture, for example when the trainer advances toward the inactive dog with leash in hand, at that time the collar will automatically "spring" to its fully opened position, thus releasing it from its tightly encircled wrapping on the dog's neck. By forming the collar in one smooth piece, there are no nitches for gathering hair and accordingly the collar will easily release from its closed position.

DESCRIPTION OF THE PREFERRED EMBODIMENT

Figure 2:
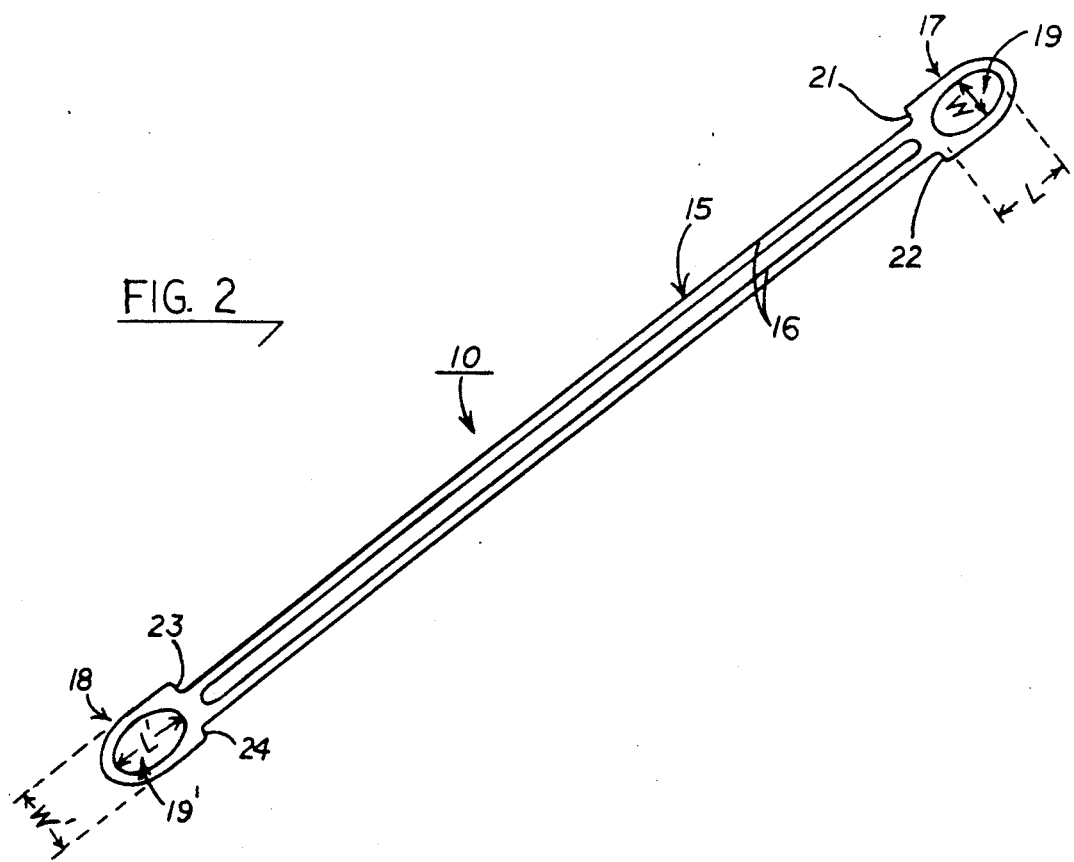
FIG. 2 illustrates the collar in its extended position as manufactured.

The preferred form of the invention is illustrated in FIG. 2 whereby the collar includes a pair of slotted end members which are integrally formed with the neck encircling band. The band comprises a pair of elongated cylinder-like members with identical slotted ends having shoulders which act as stops therefor. The collar is molded from a thermoplastic elastomer identified by the Du Pont trademark Hytrel, type 5556. This plastic material is fairly rigid and tough while possessing memory to allow it to open quickly under normal conditions once leash stresses are removed therefrom. The collar has a high resistence to flex fatigue and will remain flexible at low temperatures while resisting deterioration from dirt or oils which it may contact during use. The collar is lightweight and easy to place on the animal's neck by simply sliding a first end member through an opening in the second end member after which a training leash can be attached to the first end for applying pressure to the collar.

DETAILED DESCRIPTION OF THE DRAWINGS AND OPERATION OF THE INVENTION

Figure 1:
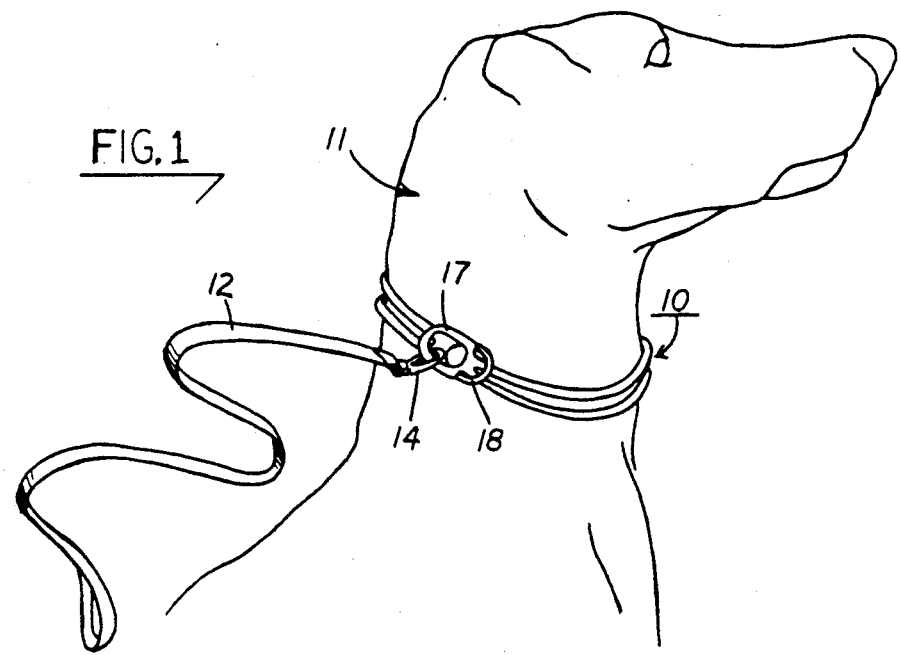
FIG. 1 demonstrates in schematic fashion the invention on the neck of a dog with a leash attached thereto.

For a more complete understanding of the invention and its use, turning now to the drawings, FIG. 1 illustrates training collar 10 on dog 11 in a substantially, fully opened noose shape. Leash 12 is connected to first end member 17 as leash clip 14 is releasably fastened to first end member 17. As would be understood, leash 12 in FIG. 1 is slack and collar 10 is open. Collar 10 as further shown in its relaxed, flat posture in FIG. 2 consists of central band 15 having two cylindrically shaped rods 16. Collar 10 is integrally formed by molding, machining or the like and is made from a thermoplastic polyester such as may be sold under the trademark "Hytrel" of Du Pont Company of Wilmington, Del. Hytrel is a synthetic thermoplastic polyester elastomer referred to as a block copolymer. The copolymer consists of a hard segment of polybutylene terephthalate and a soft segment based on a long chain polyether glycol. While the characteristics of Hytrel can be varied depending on the particular type chosen, the 5000–6000 series provides a satisfactory composition for choke type dog collars. It should be understood that various other polymeric materials such as polyurethane nylon or polypropylene and other materials in general may be used which provide the desired characteristics as hereinbefore stated. For example, materials selected should be substantially non-elastic longitudinally under normal use conditions, should be flexible over a variety of temperature ranges and should possess sufficient memory to quickly return to an open configuration once the leash becomes slack. Collar 10 should also be smooth, durable and nonirritating to the animal and should be easy to place around the dog's neck. "Memory" as used herein is defined as the inherent quality or ability of the material selected to return it quickly from a tightened or closed configuration to a fully opened configuration.

As further seen in FIG. 2, identical size end members 17, 18 provide means for receiving the opposite end member and neck encircling band 15 which are integrally formed with band 15 and define slot-like openings 19, 19'. End member 17 when rotated 90 degrees will easily slide through opening 19' of end 18 as length L' of slot 19' is greater than width W of end member 17. Once end member 17 is positioned through slot 19' of end member 18 and rotated approximately 90 degrees thereafter, shoulders 21, 22 prevent end member 17 from slipping out of opening 19'. As end members 17 and 18 are substantially identical, shoulders 23 and 24 are comparable to shoulders 21, 22 as previously discussed.

Figure 3:
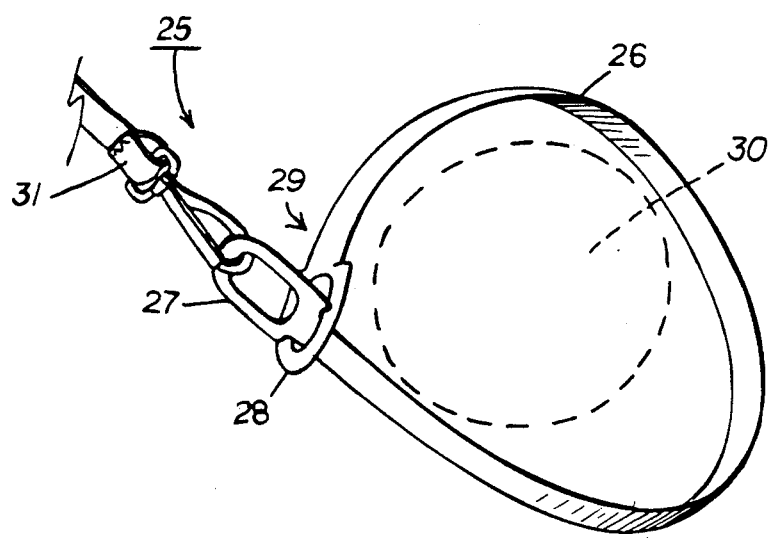
FIG. 3 demonstrates the collar as engaged on the neck of a dog but in a fully opened posture.
Figure 4:
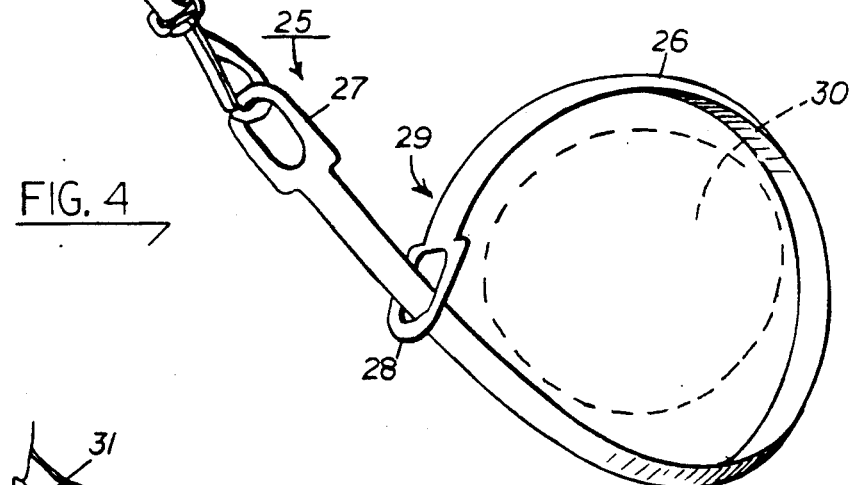
FIG. 4 illustrates the collar of FIG. 3 in a partially closed representation.
Figure 5:
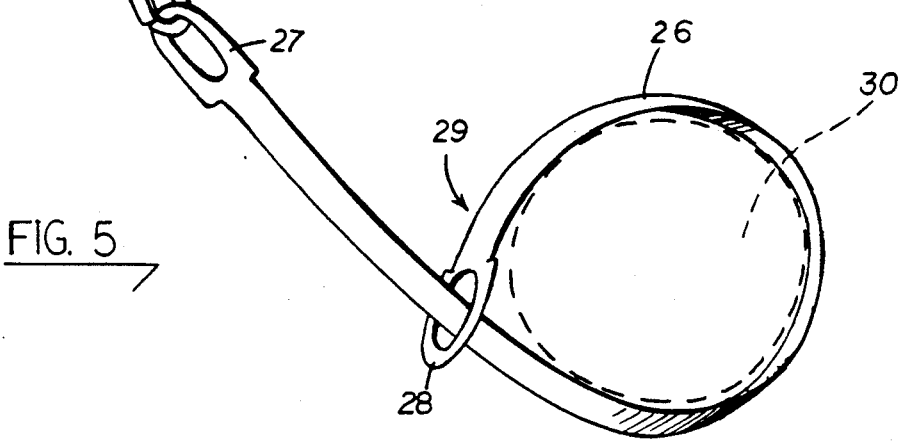
FIG. 5 demonstrates the collar of FIG. 3 fully closed.

A second embodiment of the invention is presented in FIGS. 3, 4 and 5 whereby central band 26 of collar 25 consists of a single planar strap. Collar 25 in FIG. 3 is fully opened with first end member 27 passed through second end member 28. In FIG. 4, a leash 31 has been pulled taut thereby causing noose 29 to draw tighter around schematic neck 30 therein. Further shown in FIG. 5, noose 29 has been fully, tightly drawn around neck 30. Thereafter, if leash 31 were released, collar 25 would immediately revert to its fully opened position as shown FIG. 3, thereby releasing the animal's neck from the tightly encircled band 26.

While collar 10 is manufactured in a substantially flat configuration as shown in FIG. 2, it may be advantageous under certain circumstances to heat set it in its fully opened position as shown in FIGS. 1 and 3. Nonetheless, once the leash applies pressure to the collar, it will tighten around the dog's neck and upon release, it will spring fully open thereby assisting in the training and learning speed of the animal.

The illustrations and examples provided herein are for explanatory purposes and are not intended to limit the scope of the appended claims.

I claim:

1. An animal training collar comprising: a flexible neck encircling band, said band comprising a plurality of elongated rods, a band receiver, said receiver connected to said band for slidably engaging one end of said band to form a noose, said band having sufficient memory whereby said band will resist efforts to close said noose and said noose will return to a substantially fully open configuration when the effort to close said noose is terminated.

2. An animal training collar as claimed in claim 1 wherein said band is formed from a polybutylene terphthalate thermoplastic elastomer, and including a pair of slotted end members, one of said end members attached to each end of said band.

3. An animal training collar as claimed in claim 1 wherein said collar is symmetrical.

4. An animal training collar as claimed in claim 3 wherein said elastomer comprises a block copolymer.

5. An animal training collar as claimed in claim 4 wherein said block copolymer has a soft segment based on a long-chain polyether glycol.

6. An animal training collar as claimed in claim 2 wherein said polybutylene terephthalate elastomer comprises hytrel.

7. An animal training collar comprising: a symmetrical, flexible polybutylene terephthalate elastomer neck encircling band, said band comprising a plurality of elongated rods, a first band receiver, said receiver attached to said band, said receiver for slidably engaging one end of said terephthalate elastomer band to form a noose, said band having sufficient memory whereby said band will resist forces to close said noose and upon termination of said closing forces said noose will return to an open configuration.

8. An animal training collar as claimed in claim 7 wherein said band comprises nylon.

9. An animal training collar as claimed in claim 7 and including a second band receiver, said second receiver positioned on said band, and said second receiver spaced from said first receiver.

10. An animal training collar as claimed in claim 7 wherein said first receiver comprises an end member, said end member defining a slot.

11. An animal training collar as claimed in claim 9 wherein said first and said second band receivers comprise end members.

12. An animal training collar as claimed in claim 11 wherein each of said end members are identical.

13. An animal training collar as claimed in claim 7 wherein said band has a smooth outer surface.

14. An animal training collar as claimed in claim 10 wherein said end member has a width greater than the width of said band.

15. An animal training collar as claimed in claim 10 wherein said slot is longer than the width of said end member.

16. An animal training collar as claimed in claim 10 wherein said end member is wider than the width of said slot.

17. An animal training collar as claimed in claim 7 wherein said band comprises a pair of elongated rods.

18. An animal training collar as claimed in claim 7 wherein said rods are cylindrically shaped.

* * * * *